United States Patent
Shi et al.

(10) Patent No.: US 9,501,242 B2
(45) Date of Patent: Nov. 22, 2016

(54) SOLID-STATE DRIVE DATA SECURITY ENHANCEMENT

(71) Applicant: International Business Machines Corporation, Armonk, NY (US)

(72) Inventors: Yong Hong Shi, Shanghai (CN); Qian Su, Shanghai (CN); Yu Sun, Nanjing (CN); Wei You, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 14/606,078

(22) Filed: Jan. 27, 2015

(65) Prior Publication Data

US 2015/0212751 A1    Jul. 30, 2015

(30) Foreign Application Priority Data

Jan. 28, 2014    (CN) .......................... 2014 1 0042329

(51) Int. Cl.
*G06F 12/00* (2006.01)
*G06F 3/06* (2006.01)
*G06F 21/79* (2013.01)

(52) U.S. Cl.
CPC ........... *G06F 3/0652* (2013.01); *G06F 3/0623* (2013.01); *G06F 3/0679* (2013.01); *G06F 21/79* (2013.01); *G06F 2206/1014* (2013.01); *G06F 2221/2137* (2013.01); *G06F 2221/2143* (2013.01)

(58) Field of Classification Search
CPC ... G06F 3/0652; G06F 3/0679; G06F 3/0623
See application file for complete search history.

(56) References Cited

U.S. PATENT DOCUMENTS

2013/0124785 A1    5/2013   Xiong et al.

OTHER PUBLICATIONS

Anonymous, "Smarter Erasure in Storage Cloud", An IP.com Prior Art Database Technical Disclosure, Sep. 13, 2012, IP.com No. IPCOM000221589D.
Botha, C., "SSDs with usable built-in hardware-based full disk encryption", vxlabs, Dec. 22, 2012, http://vxlabs.com/2012/12/22/ssds-with-usable-built-in-hardware-based-full-disk-encryption.
Wei et al., "Reliably Erasing Data from Flash-Based Solid State Drives", Non-Volatile Systems Laboratory, Department of Computer Science and Engineering, University of California, San Diego. http://cseweb.ucsd.edu/~m3wei/assets/pdf/FMS-2010-Secure-Erase.pdf.
Unknown, "How to securely delete files stored on a SSD?", Super User, © 2014 Stack Exchange Inc., http://superuser.com/questions/22238/how-to-securely-delete-files-stored-on-a-ssd.

(Continued)

*Primary Examiner* — Gurtej Bansal
(74) *Attorney, Agent, or Firm* — Nicholas D. Bowman

(57) ABSTRACT

Embodiments of the present disclosure provide a method and apparatus for storage control. The method comprises: in response to having received a data deletion command on sensitive data, marking a storage medium page where the sensitive data is located as invalid, and putting a storage medium block where the storage medium page is located in a garbage collection queue, wherein the storage medium block is a minimum unit of storage medium erasure in a SSD; determining a secure deletion time corresponding to the sensitive data; in response to a remaining time to a next garbage collection being longer than the secure deletion time corresponding to the sensitive data, setting a value of the remaining time as the secure deletion time; and triggering a garbage collection according to the remaining time. Using the solution according to the embodiment of the present disclosure, the security of the SSD can be enhanced.

15 Claims, 4 Drawing Sheets

(56) References Cited

OTHER PUBLICATIONS

Unknown, "Default cluster size for NTFS, FAT, and exFAT", Microsoft Support, © 2014 Microsoft. http://support.microsoft.com/kb/140365.

Unknown, "Block suballocation", Wikipedia, The Free Encyclopedia, last modified on May 10, 2014. http://en.wikipedia.org/wiki/Block_suballocation#Efficiency.

Unknown, "Data remanence", Wikipedia, The Free Encyclopedia, last modified on Oct. 18, 2014. http://en.wikipedia.org/wiki/Data_remanence.

CN Application 201410042329.4, entitled "Method and Appratus for Storage Control," filed Jan. 28, 2014.

SOLID-STATE DRIVE DATA SECURITY ENHANCEMENT

BACKGROUND

The present disclosure relates to computer technology, and more specifically, to a method, apparatus, and computer program product for data storage control.

In a traditional hard disk drive (HDD), data logical addresses and physical addresses can have a one-to-one correspondence. In the present disclosure, the logical address can refer to an address processed by an operating system, while the physical address can refer to a physical location on a storage medium. The physical address can be transparent to the operating system, and a controller of HDD can be responsible for correspondence between the logical address and the physical address. Where HDDs are used, each time the operating system writes data to the same logical address, the data may be written to the same location on the storage medium. For data deletion, the operating system will generally mark a logical address corresponding to data pending deletion as free, so that the logical address may be used by a subsequent write operation. Before the subsequent write operation actually happens, the data pending deletion is not erased from the storage medium and thus can be read and recovered by technical means.

For some sensitive data with high security requirements, the operating system's deletion operation may be a "secure deletion", i.e., the data is completely erased from the storage medium. The operating system may execute the subsequent write operation immediately after marking the logical address as free, e.g., writing pseudo-data to the logical address. Since logical addresses may have a one-to-one correspondence to physical addresses, at a physical address where the sensitive data is stored the data pending deletion is overwritten by the pseudo-data and thus may not be read or recovered.

Compared with traditional hard disk drives (HDDs), solid-state drives (SSDs) based on flash technology may have a performance (speed) advantage. Unlike HDDs, in SSD, logical addresses may not have a one-to-one correspondence to physical addresses. If there are consecutive two write operations of data to the same logical address, then the data may be stored at different physical addresses. As a result, where SSDs are used, the operating system may not erase sensitive data from the storage medium by writing pseudo-data to a logical address where the sensitive data is stored.

Specifically, in SSDs, when a first write operation is performed to a logical address so as to write a first data element, the SSD may allocate a first physical address to the logical address for storing the first data element, so that the logical address corresponds to the first physical address. When a second write operation is performed to the same logical address to write a second data element, the SSD can allocate a second physical address to the logical address for storing the second data, rather than erasing the first data element from the first physical address before writing the second data element to the first physical address. Thus, the physical address mapping to the logical address may change from the first physical address to the second physical address. A reason behind this is in SSD, erase operations to the storage medium may be implemented in a unit of storage medium block. The size of the storage medium block is typically $2^{20}$ bits. On the other hand, the operating system's data operations are typically in a unit of $2^9$ (512) bits. If, for example, the operating system writes data of 512 bytes to the same logical address twice consecutively, then the involved data is merely a very small part of data in one storage medium block. In order to modify this small part of data, it may be impractical to erase data of the whole storage medium block.

Therefore, in the case of using an SSD, even if the operating system writes pseudo-data to a certain logical address immediately after deleting sensitive data stored at the logical address, the operating system may not erase the sensitive data from SSD. The pseudo-data will be stored at a different physical address from the sensitive data, while the sensitive data is still stored at the original physical address. As a result, the sensitive data can be read and recovered, by technical means, from the physical address where the sensitive data is stored.

Therefore, there is a need for a new solution to enhance the security of SSD storage devices.

SUMMARY

Embodiments of the present disclosure provide a method and apparatus for storage control.

A method for storage control according to certain embodiments of the present disclosure comprises: in response to having received a data deletion command for sensitive data, marking a storage medium page where the sensitive data is located as invalid, and putting a storage medium block where the storage medium page is located in a garbage collection queue, wherein the storage medium block is a minimum unit of storage medium erasure in a solid-state disk (SSD); determining a secure deletion time corresponding to the sensitive data; in response to a remaining time to a next garbage collection being longer than the secure deletion time corresponding to the sensitive data, setting a value of the remaining time as the secure deletion time; and triggering a garbage collection according to the remaining time.

An apparatus for storage control according to embodiments of the present disclosure comprises: a storage medium block processing module configured to, in response to having received a data deletion command for sensitive data, mark a storage medium page where the sensitive data is located as invalid, and put a storage medium block where the storage medium page is located in a garbage collection queue, wherein the storage medium block is a minimum unit of storage medium erasure in a SSD; a secure deletion time determining module configured to determine a secure deletion time corresponding to the sensitive data; a remaining time setting module configured to, in response to a remaining time to a next garbage collection being longer than the secure deletion time corresponding to the sensitive data, set a value of the remaining time as the secure deletion time; and a triggering module configured to trigger a garbage collection according to the remaining time.

By means of the solution according to the present disclosure, deleted sensitive data can be erased from a storage medium of a SSD in a controllable time, thereby increasing the security of SSD.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
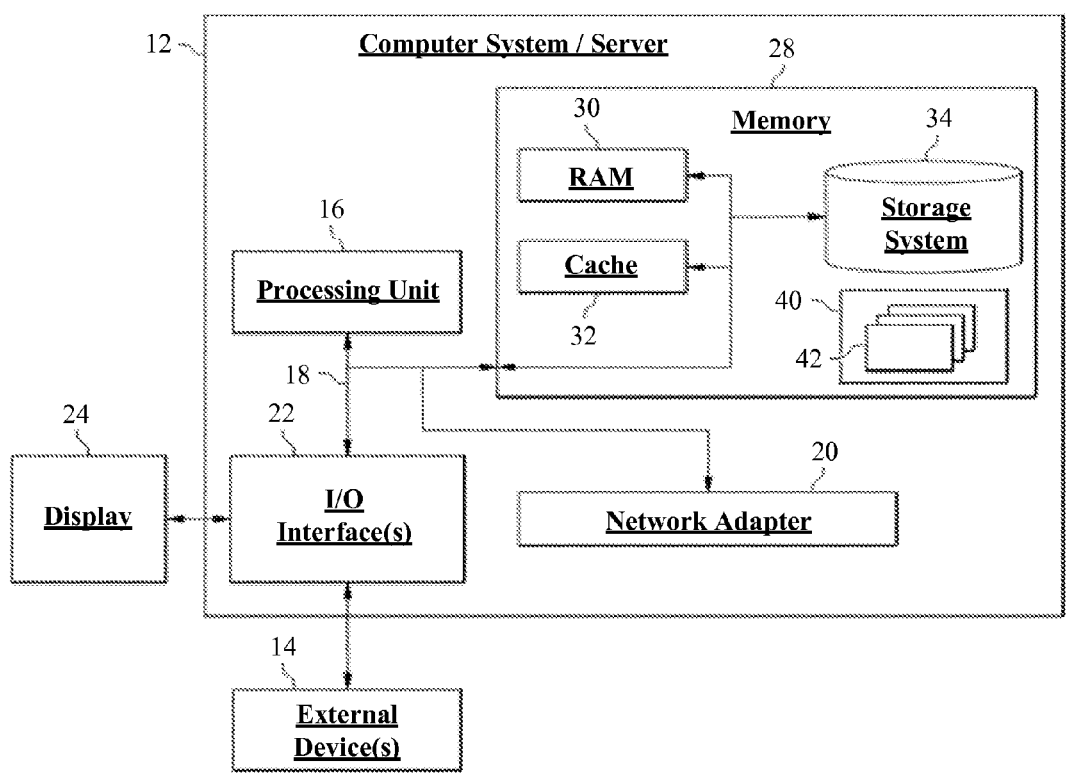
FIG. 1 shows an example computer system/server which is applicable to implement the embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

The present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit,", "module" or "system." Furthermore, aspects of the present disclosure may take the form of a computer program product embodied in one or more computer readable medium(s) having computer readable program code embodied thereon.

Any combination of one or more computer readable media may be utilized. The computer readable medium may be a computer readable signal medium or a computer readable storage medium. A computer readable storage medium may include, for example, but not limited to, an electronic, magnetic, optical, electromagnetic, infrared, or semiconductor system, apparatus, or device, or any suitable combination of the foregoing. More specific examples (a non-exhaustive list) of the computer readable storage media may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, hard-wired, optical fiber cable, RF, or other connections, or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an exemplary mobile device 12 which is applicable to implement the embodiments of the present disclosure is shown. Mobile device 12 is only illustrative and is not intended to suggest any limitation as to the scope of use or functionality of embodiments of the disclosure described herein.

As shown in FIG. 1, mobile device 12 is shown in the form of a general-purpose computing device. The components of mobile device 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Mobile device 12 typically includes a variety of computer system readable media. Such media may be any available media that is accessible by mobile device 12, and it includes both volatile and non-volatile media, removable and non-removable media.

System memory 28 can include computer system readable media in the form of volatile memory, such as random access memory (RAM) 30 and/or cache memory 32. Mobile device 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Mobile device 12 may also communicate with one or more external devices 14 such as a keyboard, a pointing device, a display 24, etc.; one or more devices that enable a user to interact with mobile device 12; and/or any devices (e.g., network card, modem, etc.) that enable mobile device 12 to communicate with one or more other computing devices. Such communication can occur via Input/Output (I/O) interfaces 22. Additionally, mobile device 12 can communicate with one or more networks such as a local area network (LAN), a general wide area network (WAN), and/or a public network (e.g., the Internet) via network adapter 20. As depicted, network adapter 20 can communicate with the other components of mobile device 12 via bus 18. It should be understood that although not shown, other hardware and/or software components could be used in conjunction with mobile device 12. Examples, include, but are not limited to: microcode, device drivers, redundant processing units, external disk drive arrays, RAID systems, tape drives, and data archival storage systems, etc.

In the following description, suppose the minimum unit that SSD allocates a physical address is consistent with the minimum unit that the operating system processes data, storage medium with such a sized is referred to as a storage medium page. Thus, it can be seen that storage medium pages and physical addresses can have a one-to-one correspondence. It may further be understood that both "storage medium pages" and "storage medium blocks" correspond to physical storage space on SSD. Since the size of a storage medium block is typically $2^{20}$ bits, while the size of a storage medium page is $2^9$ bits, one storage medium block may comprise multiple storage medium pages. For the purpose of convenient description, suppose the size of sensitive data is exactly one storage medium page.

As described above, if the operating system performs two consecutive write operations to the same logical address, then during the second write operation, the SSD can change the physical address mapping to the logical address from the first physical address to the second physical address, and can mark a storage medium page corresponding to the first physical address as invalid. In some cases, a SSD will initiate a garbage collection operation to collect those storage medium pages marked as invalid. In the process of performing the garbage collection to a target block, data stored in storage medium pages in the target block which are not marked as invalid can be transferred to new physical addresses in another storage medium block; logical addresses corresponding to these storage medium pages are re-mapped to new physical addresses; and then the target storage medium block is erased and marked as free as a whole, so that new data can be written. It may be understood that after performing the garbage collection to a target block, free storage space that is equal to all invalid storage medium pages in the target block can be released.

At the operating system level, deletion of sensitive data is embodied as marking a logical address corresponding to the sensitive data as free, so that the logical address can be used by a subsequent write operation; at the storage level, deletion of sensitive data is embodied as marking a physical address corresponding to the sensitive data as invalid, so that an SSD garbage collection is triggered under certain conditions. During the garbage collection, the sensitive data can be erased from the storage medium. Therefore, to ensure sensitive data to be erased from the storage medium, an SSD garbage collection can be triggered after deleting the sensitive data.

Generally speaking, SSDs will initiate a garbage collection where free storage space for writing new data is insufficient. Therefore, by writing a large amount of pseudo-data to a SSD, free storage space in SSD is made insufficient, thereby triggering an SSD garbage collection.

According to certain embodiments of the present disclosure, a garbage collection can be triggered through repeatedly writing pseudo-data to the logical address corresponding to sensitive data after it is deleted. Every time a pseudo-data write is performed to the logical address, the SSD can allocate a new physical address to the logical address and Mark an old physical address as invalid. Since a storage medium page corresponding to an invalid physical address may not be used for storing new data before erasure, it may not be counted into the free storage space. It can be predicted that duplicated pseudo-data writes will reduce free storage space in the SSD and thus trigger an SSD garbage collection. Since a storage medium page where sensitive data is located is an invalid storage medium page, if a storage medium block where the invalid storage medium page is located acts as a target block of the garbage collection, then the storage medium page where the sensitive data is located will be erased. In addition, except a storage medium page which is newly allocated in the last pseudo-data write, other storage medium pages where pseudo-data is stored are all invalid storage medium pages during the garbage collection and thus should be erased and marked as free storage space during the garbage collection.

According to certain embodiments of the present disclosure, large amounts of pseudo-data may also be written to a SSD after deleting sensitive data. Thus, free storage space in SSD is made insufficient, whereby a garbage collection is triggered. Similarly, during the garbage collection if a storage medium block where sensitive data is located is used as a target block of the garbage collection, then a storage medium page where the sensitive data is located can be erased.

Such practice is advantageous that it can be implemented at the operating system level and thus has great flexibility. However, when performing the garbage collection, a SSD does not necessarily use a storage medium block where sensitive data is located as a target block. Therefore, in order to ensure the storage medium block where sensitive data is located is used as a target block of the garbage collection, sufficient pseudo-data may be written to SSD so that all storage medium blocks containing invalid storage medium pages are used as a target block of the garbage collection at least once. As a result, substantially, every time sensitive data is deleted, a whole write/erase operation can be performed to the entire SSD. However, write/erase occurrences to SSD are rather limited, and the service life of SSD will be shortened. In addition, large write or erase operations require a long time, which prejudices the I/O efficiency of SSD.

Figure 2:
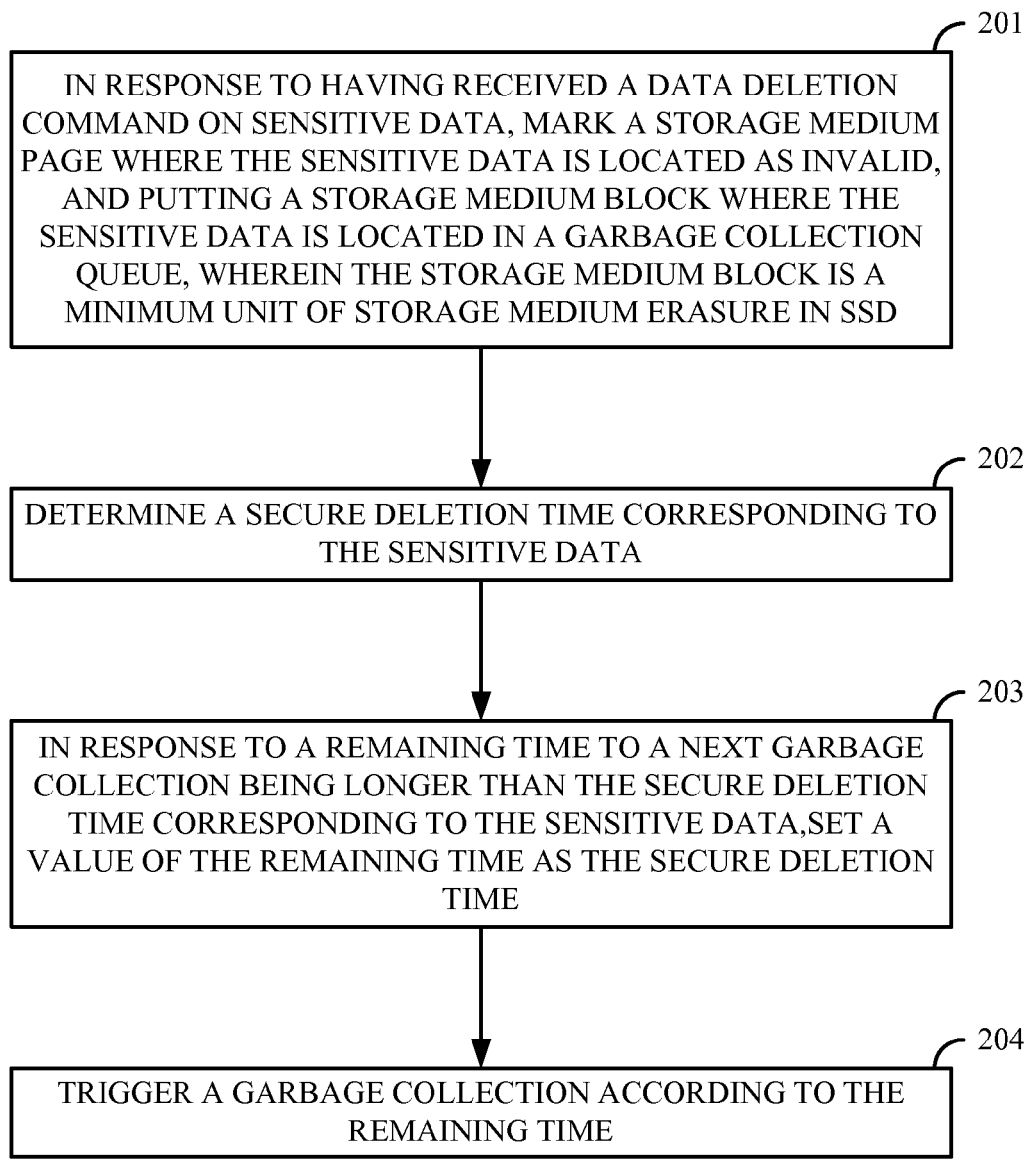
FIG. 2 shows a flowchart of a method for storage control according to certain embodiments of the present disclosure.

FIG. 2 shows a flowchart of a method for storage control according to embodiments of the present disclosure.

In operation 201, in response to having received a data deletion command on sensitive data, a storage medium page where the sensitive data is located is marked as invalid, and a storage medium block where the storage medium page is located is put in a garbage collection queue, wherein the storage medium block is a minimum unit of storage medium erasure in the SSD.

As described above, a garbage collection is a common operation in SSD. There already exist many solutions for selecting a target block of the garbage collection. For example, a storage medium block having the majority of its pages marked as invalid may be selected as the target block, or a storage medium block to which erasure has not be performed for a long time may be selected as the target block. In the SSD, there may exist at least one garbage collection queue, where at least one indicator is saved which indicates a target block of the garbage collection. Various solutions for selecting a target block of the garbage collection put an indicator, corresponding to the selected storage medium block, in the garbage collection queue. When performing the garbage collection, the SSD can perform valid data transfers to storage medium blocks in the queue and then erases these storage mediums.

It may be understood that the data deletion command at least comprises an identifier of data, such as a logical address or physical address of data. In the solution according to the embodiment of the present disclosure, the operating system may be enhanced, so that the data deletion command sent by the operating system to the SSD can indicate whether the data is sensitive data or not. The enhancement may be conducted when installing a driver of the SSD on the operating system, or by patching the operating system.

According to one embodiment of the present disclosure, the data deletion command may comprise a flag. The SSD may determine whether the data is sensitive data or not, according to a value of the flag. According to another embodiment of the present disclosure, two kinds of data deletion commands may be defined for sensitive and non-sensitive data. The SSD can determine whether the data is sensitive or not, according to which data deletion command is received.

According to particular embodiments of the present disclosure, it may be agreed between the SSD and the operating system in advance that the operating system will only use a logical address within a specific range when storing sensitive data. Thus, the SSD can determine whether the data is sensitive data or not, according to a logical address contained in the data deletion command. An advantage of such practice is that no modification needs to be made to the format of the data deletion command.

According to certain embodiments of the present disclosure, storage medium blocks dedicated for sensitive data storage and storage medium blocks dedicated for non-sensitive data storage may be separated in the SSD. The former is referred to as a sensitive data storage medium block, while the latter is referred to as a non-sensitive data storage medium block. According to a data identifier in the data deletion command, the SSD can determine whether data pending deletion is located in a sensitive data storage medium block or a non-sensitive data storage medium block, thereby determining whether the data pending deletion is sensitive data or not. Regarding how to store sensitive data and non-sensitive data in different storage medium blocks, more detailed description will be presented below with reference to other figures.

In operation 202, a secure deletion time corresponding to the sensitive data is determined. As described above, only by erasing data from the storage medium, it is ensured that the data cannot be recovered from the storage medium. In other words, in a SSD a storage medium page where data pending deletion is located is only marked as invalid instead of being erased from the storage medium before a garbage collection takes place. According to embodiments of the present disclosure, a secure deletion time is defined for sensitive data, and the secure deletion time indicates how soon the sensitive data should be erased from the storage medium after deletion. It may be understood the more sensitive that the data is, the shorter its secure deletion time is. For data with the highest sensitivity level, its secure deletion time may be set to 0, so that it is ensured the sensitive data is erased immediately after deletion.

Since data on the storage medium page may be erased only during the garbage collection and the garbage collection may take a storage medium block as a minimum unit, the secure deletion time may refer to the greatest time interval between deletion of the sensitive data and the garbage collection to the storage medium block(s) where the sensitive data is located.

According to one embodiment of the present disclosure, a secure deletion time may be set when writing the sensitive data, and then the secure deletion time is stored in the SSD in connection with the sensitive data. According to another embodiment of the present disclosure, the secure deletion time may also be set when deleting the sensitive data. An advantage of such practice is that no additional SSD storage space is needed for storing a secure deletion time corresponding to the sensitive data. For example, a value of the secure deletion time may be contained in the data deletion command. Alternatively, a value of the secure deletion time is transferred from the operating system to the SSD by using a separate command, before or after the data deletion command.

In operation 203, in response to a remaining time to a next garbage collection being longer than the secure deletion time corresponding to the sensitive data, a value of the remaining time is set as the secure deletion time.

In some SSDs, garbage collections are conducted periodically, i.e., the garbage collections are triggered regularly. In this case, a remaining time to a next garbage collection has a definite value. Accordingly, the remaining time may be directly compared with the secure deletion time.

In some SSDs, the garbage collection is triggered by an event rather than regularly. For example, the garbage collection may be triggered where an SSD's free storage space is insufficient or when the SSDs I/O load is lower than a given threshold. In this case, it may be considered the remaining time is longer than the secure deletion time, so that a value of the remaining time is set as the secure deletion time. Afterwards, the remaining time has a definite value, so that the remaining time may be directly compared with other secure deletion time when operation 202 is subsequently executed again.

In operation 204, a garbage collection is triggered according to the remaining time. It may be understood that the remaining time can decrease gradually. When the remaining time equals zero, a garbage collection to a target block indicated by an indicator in the garbage collection queue can be triggered. Data in valid storage medium pages in these storage medium blocks will be transferred to other storage medium blocks, and then these storage medium blocks can be erased. Accordingly, sensitive data in these storage medium blocks can be also erased.

By means of the solution according to embodiments of the present disclosure, after sensitive data is deleted, a storage medium block where the sensitive data is located in the put into the garbage collection queue. Within a secure deletion time corresponding to the sensitive data, a SSD can perform at least one garbage collection so that a storage medium where the sensitive data is located can be erased. Thus, it is ensured sensitive data is erased within a given time after deletion of the sensitive data. For some sensitive data, the secure deletion time may be set to 0. Thus, after the sensitive data is deleted, a garbage collection can be triggered immediately, so that the sensitive data can be erased.

The method described in reference to FIG. 2 may be implemented by a computer system (see FIG. 1) as a computer program product, which may include the operations described in reference to FIG. 2. In embodiments, a computer program product may, for example, include all or a subset of the steps described with respect to FIG. 2, and in particular embodiments a computer program product may include additional operations beyond those described in reference to FIG. 2.

Figure 3:
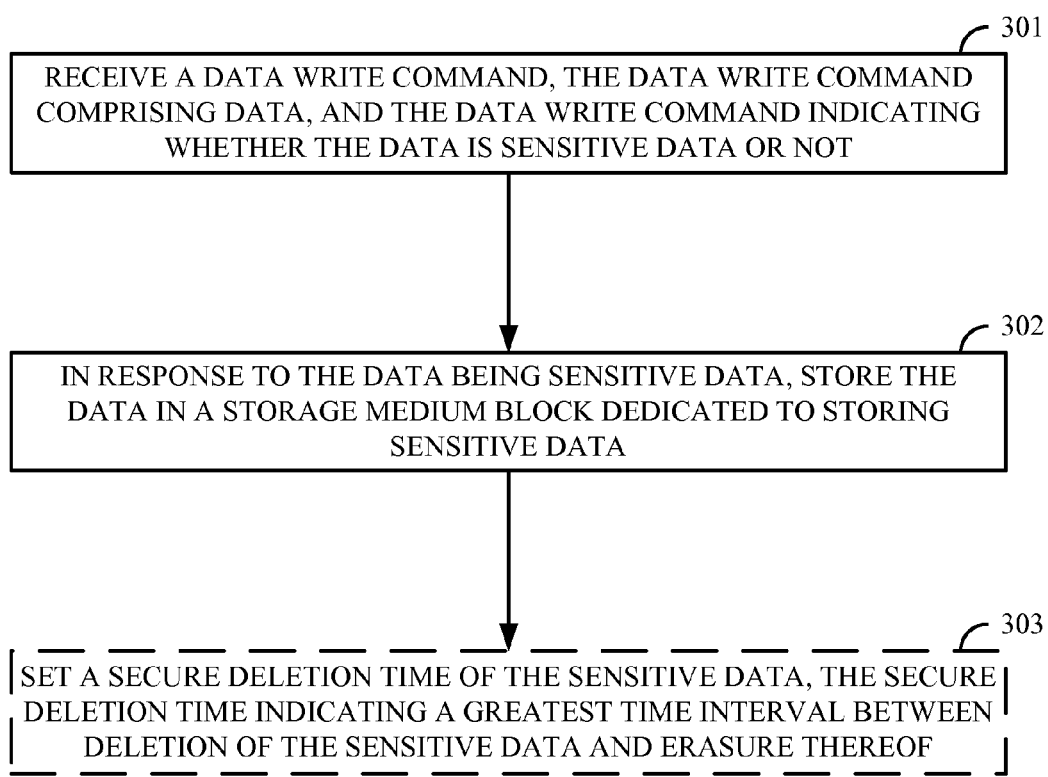
FIG. 3 shows a flowchart of a method for storage control according to embodiments of the present disclosure.

With reference to FIG. 3, a description is presented below to how to store sensitive data and non-sensitive data in different storage medium blocks according to embodiments of the present disclosure.

In operation 301, a data write command is received, the data write command comprising data, and the data write command indicating whether the data is sensitive data or not.

In the solution according to embodiments of the present disclosure, the operating system can be enhanced so that a data write command sent by the operating system to SSD can indicate whether the data is sensitive data or not. The enhancement may be conducted when installing a driver of SSD on the operating system, or by patching the operating system.

According to one embodiment of the present disclosure, the data write command may comprise a flag. The SSD may determine whether the data is sensitive data or not, according to a value of the flag. According to another embodiment of the present disclosure, two different data write commands may be set. The SSD may judge whether the data is sensitive data or not, according to which data write command is received.

In addition to data, per se, the data write command from the operating system can further comprise a logical address corresponding to the data. It may be agreed between the SSD and the operating system in advance that the operating system will only use a logical address within a specific range when storing sensitive data. Thus, the SSD can determine whether the data is sensitive data or not, according to a logical address contained in the data write command. An advantage of such practice is that no modification may need to be made to the format of the data write command.

In operation 302, in response to the data being sensitive data, the data can be stored in a storage medium block dedicated to storing sensitive data.

If the data is sensitive data, then a storage medium page can be allocated from a storage medium block dedicated to storing sensitive data, and a physical address of the storage medium page can be associated with the logical address.

Generally speaking, if a storage medium block includes free storage medium pages, then the SSD will generally allocate space in this storage medium block until the storage medium block contains no free storage medium page; afterwards, the SSD can allocate storage space in a new storage medium block.

In a circumstance of certain embodiments of the present disclosure, the SSD can record a storage medium block that is currently being used for storing sensitive data, and such the storage medium block is referred to as a current sensitive storage medium block. If the current sensitive storage medium block still has free storage medium pages, they can be used for storing new sensitive data sent by the data write command. If the current sensitive storage medium block contains no free storage medium page, then SSD can mark a new storage medium block as a current sensitive storage medium block and then allocate a storage medium page in the new storage medium block for storing the data. It may be understood that this new storage medium block should meet a condition that the storage medium block contains no valid storage medium page used for storing non-sensitive data.

In operation 303, a secure deletion time of the sensitive data can be set, the secure deletion time indicating a greatest time interval between deletion of the sensitive data and erasure thereof.

As described above, in addition to setting a corresponding secure deletion time when deleting sensitive data, the secure deletion time may further be set when storing the sensitive data to SSD. To achieve this object, a value of the secure deletion time may be contained in the data write command from the operating system. The SSD, after receiving the data write command, consent a secure deletion time of the sensitive data according to a value of the secure deletion time included in the command. Alternatively, a value of the secure deletion time may be transferred from the operating system to SSD by using a separate command, before or after the data deletion command.

Using the above method, sensitive data and non-sensitive data can be separately stored in different storage medium blocks. For a storage medium block where non-sensitive data is stored, since no secure deletion is involved, the garbage collection can be conducted as usual. Such a garbage collection considers write/erase occurrences to SSD, so little impact will be exerted on the service life of SSD. For a storage medium block where sensitive data is stored, since a secure deletion time is set, it can be ensured the garbage collection is performed within the set time to the storage medium block where the sensitive data is located, so that the sensitive data can be erased from the storage medium. Although such a garbage collection will exert an adverse impact on the service life of the SSD, this impact is only limited to the storage medium blocks for storing the sensitive data. Obviously, the method as shown in FIG. 2 can extend the service life of SSD over the practice of writing huge pseudo-data to the whole SSD.

As seen from the foregoing description, there can be many differences in processing sensitive and non-sensitive data according to the embodiment of the present disclosure. For example, when writing sensitive data to a storage medium, the sensitive data possibly may be written to a storage medium block dedicated to sensitive data, and perhaps a corresponding secure deletion time has to be processed; after deleting sensitive data, a storage medium block where the sensitive data is located can be put in a garbage collection queue immediately, and a remaining time to a next garbage collection needs to be compared with a secure deletion time corresponding to the sensitive data.

Therefore, according to embodiments of the present disclosure, two different modules may be used to process sensitive data and non-sensitive data respectively. These two modules may be two hardware modules or two software modules. In a circumstance of software implementation, the embodiment of the present disclosure may be implemented as a file translation layer (FTL). According to the embodiment of the present disclosure, a SSD can have two FTLs, one of which is used to process non-sensitive data and the other is used to process sensitive data. The former is referred to as non-sensitive FTL, while the latter is referred to as sensitive FTL. For the non-sensitive FTL, it may use the same solution as an existing FTL. For the sensitive FTL, it needs to conduct a series of processing operations to sensitive data according to the embodiment of the present disclosure. Compared with using one FTL to process both sensitive and non-sensitive data, using two FTLs to respectively process sensitive and non-sensitive data may be advantageous in that it is not necessary to determine whether data is sensitive data or not every time when the data is processed. Once the SSD learns the data is sensitive, it only has to transfer the data over to the sensitive FTL. The sensitive FTL processes any subsequent operations to the data just as processing sensitive data, without a need to determine first whether the data is sensitive data or not every time when the data is processed.

Typically, an apparatus according to embodiments of the present disclosure may be implemented by a computer program running on the exemplary computer system shown in FIG. 1. Although what is shown in FIG. 1 represents a hardware structure of a general-purpose computer system, since the computer program is running on the computer system and implements the method according to the embodiment of the present disclosure, the computer system/server changes to an apparatus according to the embodiment of the present disclosure from a general-purpose computer system/server.

In addition, although the apparatus according to embodiments of the present disclosure is implemented by the same general-purpose computer system as a whole, various means or modules forming the apparatus can be essentially implemented by stand-alone hardware. This is because that when the general-purpose computer is running the computer program, usually various modules are implemented in a sharing style like time-sharing or processor core-sharing. Using time-sharing implementation as an example, at a specific moment, the general-purpose computer system acts as hardware dedicated to specific means or modules; at a different moment, the general-purpose computer system acts as different hardware dedicated to different means or modules. Therefore, the apparatus according to the embodiment of the present disclosure is a combination of a series of hardware-implemented modules, rather than being no more than function module architecture. On the contrary, the apparatus according to the embodiment of the present disclosure may also be construed as an entity apparatus that implements the solution according to the embodiment of the present disclosure in hardware style.

Figure 4:
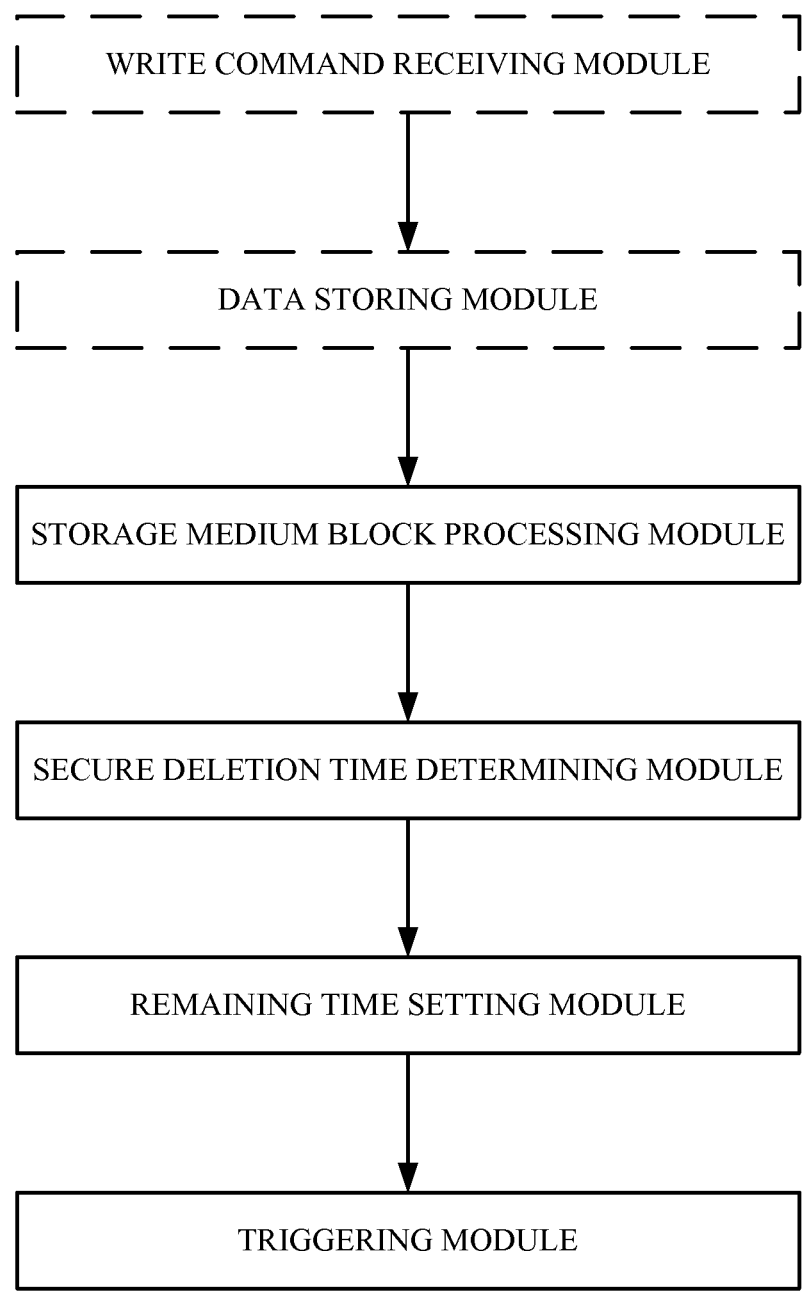
FIG. 4 shows a block diagram of an apparatus for storage control according to embodiments of the present disclosure.

FIG. 4 shows an apparatus for storage control according to one embodiment of the present disclosure, the apparatus comprising:

a storage medium block processing module configured to, in response to having received a data deletion command on sensitive data, mark a storage medium page where the sensitive data is located as invalid, and put a storage medium block where the storage medium page is located in a garbage collection queue, wherein the storage medium block is a minimum unit of storage medium erasure in SSD;

a secure deletion time determining module configured to determine a secure deletion time corresponding to the sensitive data;

a remaining time setting module configured to, in response to a remaining time to a next garbage collection being longer than the secure deletion time corresponding to the sensitive data, set a value of the remaining time as the secure deletion time; and a triggering module configured to trigger a garbage collection according to the remaining time.

The apparatus further comprises a write command receiving module configured to receive a data write command, the data write command comprising data, and the data write command indicating whether the data is sensitive data or not; and a data storing module configured to, the data being sensitive data, store the data in a storage medium block dedicated to storing sensitive data, wherein the storage medium block dedicated to storing sensitive data includes no valid storage medium page used for storing non-sensitive data, wherein the secure deletion time is set when deleting the sensitive data, wherein the secure deletion time is set when writing the sensitive data, and wherein different modules are used to respectively process sensitive data and non-sensitive data.

In particular embodiments of the present disclosure, the apparatus is implemented independently of the first application and the second application. The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for data storage control, comprising:
    in response to having received a data deletion command for sensitive data, marking a storage medium page where the sensitive data is located as invalid, and putting a storage medium block where the storage medium page is located in a garbage collection queue, wherein the storage medium block is a minimum unit of storage medium erasure in SSD;
    determining a secure deletion time corresponding to the sensitive data;
    in response to a remaining time to a next garbage collection being longer than the secure deletion time corresponding to the sensitive data, setting a value of the remaining time as the secure deletion time; and
    triggering a garbage collection according to the remaining time.

2. The method of claim 1, further comprising:
    receiving a data write command, the data write command comprising data, and the data write command indicating whether the data is sensitive data; and
    in response to the data being sensitive data, storing the data in a storage medium block dedicated to storing sensitive data, wherein the storage medium block dedicated to storing sensitive data includes no valid storage medium page used for storing non-sensitive data.

3. The method of claim 1, wherein the secure deletion time is set when deleting the sensitive data.

4. The method of claim 1, wherein the secure deletion time is set when writing the sensitive data.

5. The method of claim 1, wherein different modules are used to respectively process sensitive data and non-sensitive data.

6. An apparatus for storage control, comprising:
    a storage medium block processing module configured to, in response to having received a data deletion command on sensitive data, mark a storage medium page where the sensitive data is located as invalid, and put a storage medium block where the storage medium page is located in a garbage collection queue, wherein the storage medium block is a minimum unit of storage medium erasure in SSD;
    a secure deletion time determining module configured to determine a secure deletion time corresponding to the sensitive data;
    a remaining time setting module configured to, in response to a remaining time to a next garbage collection being longer than the secure deletion time corresponding to the sensitive data, set a value of the remaining time as the secure deletion time; and
    a triggering module configured to trigger a garbage collection according to the remaining time.

7. The apparatus of claim 6, further comprising:
    a write command receiving module configured to receive a data write command, the data write command comprising data, and the data write command indicating whether the data is sensitive data; and
    a data storing module configured to, in response to the data being sensitive data, store the data in a storage medium block dedicated to storing sensitive data, wherein the storage medium block dedicated to storing sensitive data includes no valid storage medium page used for storing non-sensitive data.

8. The apparatus of claim 6, wherein the secure deletion time is set when deleting the sensitive data.

9. The apparatus of claim 6, wherein the secure deletion time is set when writing the sensitive data.

10. The apparatus of claim 6, wherein different modules are used to respectively process sensitive data and non-sensitive data.

11. A computer program product for data storage control, the computer program product comprising a non-transitory computer-readable storage medium having program instructions embodied therewith, the program instructions executable by one or more processing circuits to cause the one or more processing circuits to perform a method comprising:
    in response to having received a data deletion command for sensitive data, marking a storage medium page where the sensitive data is located as invalid, and putting a storage medium block where the storage medium page is located in a garbage collection queue, wherein the storage medium block is a minimum unit of storage medium erasure in SSD;
    determining a secure deletion time corresponding to the sensitive data;
    in response to a remaining time to a next garbage collection being longer than the secure deletion time corresponding to the sensitive data, setting a value of the remaining time as the secure deletion time; and
    triggering a garbage collection according to the remaining time.

12. The computer program product of claim 11, wherein the program instructions are executable to further cause the one or more processor circuits to:

receive a data write command, the data write command comprising data, and the data write command indicating whether the data is sensitive data; and in response to the data being sensitive data, store the data in a storage medium block dedicated to storing sensitive data, wherein the storage medium block dedicated to storing sensitive data includes no valid storage medium page used for storing non-sensitive data.

13. The computer program product of claim 11, wherein the program instructions are executable to further cause the one or more processor circuits to set the secure deletion time when deleting the sensitive data.

14. The computer program product of claim 11, wherein the program instructions are executable to further cause the one or more processor circuits to set the secure deletion time when writing the sensitive data.

15. The computer program product of claim 11, wherein the program instructions are executable to further cause the one or more processor circuits to use different modules to respectively process sensitive data and non-sensitive data.

* * * * *